(12) United States Patent
Golder

(10) Patent No.: US 11,557,955 B2
(45) Date of Patent: Jan. 17, 2023

(54) SCALABLE HYSTERESIS CLUTCH

(71) Applicant: STAHL CRANESYSTEMS GMBH, Kuenzelsau (DE)

(72) Inventor: Markus Golder, Kuenzelsau (DE)

(73) Assignee: STAHL CRANESYSTEMS GMBH, Kuenzelsau (DE)

( * ) Notice: Subject to any disclaimer, the term of this patent is extended or adjusted under 35 U.S.C. 154(b) by 51 days.

(21) Appl. No.: 16/964,334

(22) PCT Filed: Jan. 24, 2019

(86) PCT No.: PCT/EP2019/051706
§ 371 (c)(1),
(2) Date: Jul. 23, 2020

(87) PCT Pub. No.: WO2019/145397
PCT Pub. Date: Aug. 1, 2019

(65) Prior Publication Data
US 2021/0044197 A1 Feb. 11, 2021

(30) Foreign Application Priority Data
Jan. 26, 2018 (DE) ...................... 10 2018 101 765.0

(51) Int. Cl.
*H02K 49/10* (2006.01)
*H02K 1/02* (2006.01)

(52) U.S. Cl.
CPC ............. *H02K 49/106* (2013.01); *H02K 1/02* (2013.01)

(58) Field of Classification Search
CPC .... H02K 49/106; H02K 1/02; H02K 2213/03; H02K 49/065
See application file for complete search history.

(56) References Cited

U.S. PATENT DOCUMENTS

| 3,573,518 A | 4/1971 | Liles |
| 4,876,471 A | 10/1989 | Lacour |
| 9,059,627 B2 | 6/2015 | Englert |

(Continued)

FOREIGN PATENT DOCUMENTS

| CN | 1100228 A | * 3/1995 | ........... H01F 1/0573 |
| CN | 102611280 A | 7/2012 | |

(Continued)

OTHER PUBLICATIONS

CN1100228A_Englishtranslation (Year: 2022).*

(Continued)

*Primary Examiner* — Tulsidas C Patel
*Assistant Examiner* — Viswanathan Subramanian
(74) *Attorney, Agent, or Firm* — Cantor Colburn LLP

(57) ABSTRACT

A hysteresis clutch including a first rotor with magnets that are polarized in opposite directions in pairs in a circumferential direction and between which pole pieces are provided for deflecting the magnetic flux in the radial direction and a second rotor of the hysteresis clutch has a series of second permanent magnets that extend in the circumferential direction and which are arranged on a circle that is concentric to the rotational axis A, the number of the first magnets and the number of the second magnet are configured such that a smooth torque curve is achieved which is free of a detent torque or at least has a low detent torque.

18 Claims, 3 Drawing Sheets

(56) References Cited

U.S. PATENT DOCUMENTS

| | | |
|---|---|---|
| 10,112,810 B2 | 10/2018 | Golder |
| 2004/0150283 A1 | 8/2004 | Calfo et al. |
| 2012/0156071 A1 | 6/2012 | Hijikata et al. |
| 2012/0262017 A1 | 10/2012 | Mengibar |
| 2013/0113317 A1 | 5/2013 | Englert |
| 2015/0027828 A1 | 1/2015 | Michelson |

FOREIGN PATENT DOCUMENTS

| | | |
|---|---|---|
| DE | 3518223 A1 | 1/1986 |
| DE | 8632186 | 3/1987 |
| DE | 202008003931 U1 | 7/2009 |
| DE | 102009039658 A1 | 3/2011 |
| DE | 102014101655 A1 | 2/2014 |
| EP | 1843454 A1 | 10/2007 |
| EP | 2330724 A1 | 6/2011 |
| EP | 2395635 A1 | 12/2011 |
| EP | 2502875 A1 | 9/2012 |
| FR | 2937390 A1 | 4/2010 |
| JP | H07111772 A | 4/1995 |
| JP | H1127928 A | 1/1999 |
| JP | 2004119822 A * | 4/2004 |
| JP | 2006352952 A | 12/2006 |
| JP | 2010183684 A | 8/2010 |
| JP | 2013048522 A | 3/2013 |
| JP | 2013513077 A | 4/2013 |
| JP | 2017192175 | 10/2017 |
| WO | 2013138971 A1 | 9/2013 |

OTHER PUBLICATIONS

JP2004119822A_Englishtranslation (Year: 2022).*
NdFeB typical-magnetic-properties2 (Year: 2022).*
Sintered-alnico-magnet-properties (Year: 2022).*
German Office Action for Application No. 19 701 645.4; dated May 27, 2021.
English Translation of International Search Report for Application No. PCT/EP2019/051706.
International Search Report for Application No. PCT/EP2019/051706.
Written Opinion for Application No. PCT/EP2019/051706.
Germain Office Action dated Dec. 17, 2018.
Chinese Office Action for Chinese Application No. 201980009902.2; dated Feb. 7, 2022; 9 Pages.
Translation of Chinese Office Action for Chinese Application No. 201980009902.2; dated Feb. 7, 2022; 10 Pages.
English Translation of Japanese Office Action for JP Application No. 2020-540425; dated Oct. 14, 2022; 5 pages.
Japanese Office Action for JP Application No. 2020-540425; dated Oct. 14, 2022; 3 pages (No English Translation).

* cited by examiner

SCALABLE HYSTERESIS CLUTCH

CROSS REFERENCE TO RELATED APPLICATIONS

This application is a National Stage of PCT Application No. PCT/EP2019/051706 filed on Jan. 24, 2019, which claims priority to German Patent Application No. 10 2018 101 765.0 filed on Jan. 26, 2018, the contents each of which are incorporated herein by reference thereto.

TECHNICAL FIELD

The invention refers to a hysteresis clutch, particularly for transmitting of torques in machines and plants such as cranes, hoists, traction drives, machine tools and the like.

BACKGROUND

The arrangement of hysteresis clutch in the drive train of a hoist is, for example, known from U.S. Pat. No. 3,573,518. The hysteresis clutch comprises two rotors, one of which is connected with the motor shaft and driven by it. The other rotor of the hysteresis clutch is connected with the input shaft of a transmission that forms part of the hoist. The rotor connected with the motor comprises ceramic magnets that are arranged on a concentric circle with regard to the rotation axis and that are polarized in circumferential direction. Between the magnets pole pieces are arranged that define changing poles at the axial face of the rotor. The second rotor is formed by a plate of a permanent magnetic material such as, e.g. AlNiCo rotatingly supported about the same rotation axis.

The rotor carrying the permanent magnets and connected with the motor shaft is remarkably more voluminous than the rotor connected with the transmission input shaft and therefore comprises a higher moment of inertia than the rotor of the transmission side. In addition, the rotor of the motor side inevitably comprises a relatively strong radial stray field due to its magnet arrangement that is guided partly through a tune band extending around its periphery that thus forms a magnetic short circuit for a portion of the stray field. The remaining portion of the radial stray field passes through the clutch housing and creates eddy currents there during rotation of the motor. This decelerates the motor and contributes to power loss.

In addition, a hysteresis clutch is known from U.S. Pat. No. 4,876,471 in which a first rotor provided with permanent magnets is rotatably arranged in the substantially cylindrical inner space of a second rotor that comprises hysteresis plates on its two axial face sides. They consist to a large extent of its volume of an electrically insulating binding material that is filled with AlNiCo-powder. The second rotor is closed on the side of the outer periphery.

A hysteresis clutch with two rotors that limit a disc-shaped gap is moreover known from DE 20 2008 003 931 U1. While one of the rotors carries magnets, the other rotor is configured as hysteresis disc. By adjustment of the distance between the two rotors, the torque to be transmitted can be adjusted.

In addition, a hoist with hysteresis clutch is known from DE 10 2014 101 655 A1 in which between the first and second rotor of the hysteresis clutch a cylindrical air gap is defined.

The hysteresis clutches known from the prior art are respectively designed with regard to their planned scale. The respective presented concepts do not allow, or only in a limited manner, a realization in different overall sizes as they may be required by use in other relationships.

BRIEF SUMMARY

It is the object of the present invention to provide a concept for a hysteresis clutch that allows the construction of such clutches in a large load and use range and in different scales.

A hysteresis clutch for transmitting rotational energy in machines, including: a first rotor rotatable about a rotation axis that comprises a plurality of permanent magnets with a first coercive field strength; a second rotor rotatable about the rotation axis, the second rotor having at least two permanent magnets with a second coercive field strength, the second coercive field strength being lower than the first coercive field strength, the at least two permanent magnets being arranged sequentially in a slip direction; and a truncated cone-shaped or cylindrical air gap located between the first rotor and the second rotor.

The inventive hysteresis clutch includes two rotors that are respectively equipped with multiple permanent magnets of different coercive field strength. Between the two rotors a truncated-cone-shaped or a cylindrical air gap is defined. In doing so, a thus far used construction principle is left according to which namely the second rotor provided with hysteresis material was, as far as possible, persistently continuously configured up to now. The construction of the second rotor with multiple individual permanent magnets that are successively arranged in circumferential direction allows the construction of remarkably torque powerful clutches with large diameters as well as the construction of smaller clutches.

The second rotor comprises in slip direction, i.e. in circumferential direction, at least two, multiple permanent magnets that are arranged in series forming a closed ring. In doing so, limitations with regard to the scale are omitted, as they are otherwise given due to the limited manufacturing possibilities for ring-shaped permanent magnets, particularly AlNiCo-magnets. Due to the discontinuous series of permanent magnets of the second rotor in the slip direction, hysteresis clutches of arbitrary scale can be realized. The series of permanent magnets of the second rotor include multiple, e.g. three, five, seven, eight or another number of individual, preferably cylinder-dish-shaped magnets. Air gaps or interstices extending in axial and radial direction can be configured between the magnets. The air gaps can contain holding means for the magnets.

The hysteresis clutch is closed in circumferential direction which mitigates influences of the stray field on the environment, particularly the clutch housing, whereby in turn high rotation speeds are allowed. In addition, this construction of the hysteresis clutch forms the basis for a compact design in which both rotors can have a low moment of inertia. Particularly the attainment of a high transmittable torque with concurrent suppression of detrimental stray fields is achieved with a substantial radial orientation of a magnetic field in the air gap obtained thereby. A clutch is created that provides a high transmittable torque and concurrently comprises a low moment of inertia while having a small scale.

The permanent magnets of both rotors consist of hard magnetic materials, however, of different coercive field strength. In addition, the permanent magnets of the two rotors distinguish by the maximum energy product of the respectively used material. While the first rotor includes permanent magnets with a maximum energy product that is larger than 100 $kJ/m^3$, preferably larger than 200 $kJ/m^3$ and can have an amount up to over 500 kJ/m³, the energy product of the at least one permanent magnet of the second rotor is over 50 kJ/m³. For example, the permanent magnets of the first rotor can be rare earth magnets, such e.g. neodymium magnets, whereas the permanent magnets of the second rotor can be AlNiCo-magnets. While the permanent magnets of the first rotor maintain their magnetization during operation, the permanent magnets of the second rotor are remagnetized continuously during operation as soon as the clutch slips.

The permanent magnets of the first rotor are polarized in circumferential direction referring to the rotation axis of the rotor, whereby magnets adjacent to each other are respectively polarized in opposite direction. For this the permanent magnets include a distinctive magnetic anisotropy with a magnetization predominant direction in circumferential direction. Then between the magnets of the first rotor respective pole pieces are arranged that create a radial flux from the polarization of adjoining magnets directed in opposite circumferential direction.

The permanent magnets of the first rotor are configured as prisms orientated parallel to the rotation axis that comprise a trapezoid cross-section, whereby the narrow side of the trapezoid is arranged radially outward and the large side is arranged radially inward. Thereby the permanent magnets of the first rotor are arranged on a circle that is concentric with regard to the rotation axis of the rotor.

The second rotor also comprises multiple permanent magnets that are also arranged on a circle concentric to the rotation axis. Thereby the permanent magnets of the second rotor are configured in a cylinder-dish-shaped manner and each comprise a dish inner side that limits the air gap radially outward. The dish inner side is arranged on a skin surface of a virtual cylinder, the middle axis of which coincides with the rotation axis of the first rotor and thus the clutch.

The radial thickness of the permanent magnets of the second rotor is dimensioned such that the magnetic flux created by the permanent magnets of the first rotor creates a saturation flux density at least at one location of the permanent magnet of the second rotor. The radial thickness of the permanent magnets of the second rotor is dimensioned such that the magnetic flux created by the permanent magnets of the first rotor brings the material of the permanent magnet to the saturation flux density on a longitudinal section plane of each permanent magnet of the second rotor. In doing so, a high transmittable torque with concurrently low weight or moment of inertia is achieved.

The number of permanent magnets of the second rotor is different from the number of permanent magnets of the first rotor. The first pole angles defined by the first permanent magnets are obtained from 360° divided by the number of first permanent magnets. The second pole angles defined by the second permanent magnets are obtained from 360° divided through the number of second permanent magnets. The first and second pole angles have no common integer divisor. Thus, the number of permanent magnets of the two rotors are defined such that a particularly smooth torque transmission is achieved also in the slip condition.

The number A of permanent magnets of the first rotor and the number B of permanent magnets of the second rotor are co-prime. This means: a) that the number A of first permanent magnets and the number B of second permanent magnets cannot be divided through each other and b) that no integer exists through which both numbers can be likewise divided. Possible pairs are, e.g. 30 first, 7 second permanent magnets, 20 first, 9 second permanent magnets etc.

The permanent magnets of the second rotor form a collar that is concentric to the rotation axis. Between the individual permanent magnets of the second rotor uniform interstices are formed that are preferably orientated parallel to the rotation axis in axial direction. Measured in circumferential direction the interstices are narrower than the respective width of the pole pieces measured in circumferential direction at the air gap. The permanent magnets of the second rotor are held in a laminated holder, the individual metal sheets thereof can comprise noses engaging in the interstices for form fit support of the permanent magnets. The individual metal sheets are made from a non-magnetic or diamagnetic, good heat conducting metal, such as aluminum or the like. Alternatively, the holder can be manufactured from a plastic or another electrically and magnetically non-conductive material. By configuration of the holder in the shape of a stack of individual metal sheets or by configuration of electrically and magnetically non-conductive material, eddy current losses are minimized and a slip characteristic curve with an inclination can be obtained that is defined by the electric conductance of the permanent magnets of the second rotor.

The permanent magnets of the second rotor have an axial dimension that coincides with the axial dimension of the pole pieces. In doing so, at each location of the circumference of the second rotor always only at most one permanent magnet is present. Alternatively, it is however also possible to configure the second rotor with two or more groups of permanent magnets, namely a first group that is arranged on a first collar concentric to the rotation axis and a second group that is arranged on a second collar concentric to the rotation axis. As required, further groups of permanent magnets can be provided accordingly. The permanent magnets of the two or more groups can be arranged axially abutting against each other. Between axially adjacent permanent magnets of the two groups, also an electrically insulating intermediate layer can be provided that reduces eddy currents. The axially adjacent magnets of the two groups can be arranged flush with each other or angularly offset from each other such that one permanent magnet of one group covers an interstice between magnets that are adjacent in circumferential direction of the other group. With such a configuration particularly flat torque transmission characteristic curves can be achieved in which the amount of the transmitted torque increases only slightly with increasing slip.

A smooth torque progress that is free of detent torque or at least has low detent torque is achieved, if the number M of the permanent magnets of the first rotor and the number of permanent magnets S of the second rotor are defined in consideration of each other while complying with specific conditions. The two numbers M and S are defined according to at least one of the two conditions indicated in the following, preferably they fulfill both conditions:
  a) The two numbers M and S are co-prime, i.e. the numbers M and S do not have a common integer divisor by which a torque progress is achieved having low detent torque;
  and/or
  b) The product of both numbers M and S divided by 180 is an integer power of two ($M*S/180=2^N$, [N=0, 1, 2, 3 . . . ]) by which a detent torque-free torque progress is achieved.

These conditions apply at least for M being less or equal to 160 and S being less or equal to 45.

Examples for suitable pairs of numbers M, S are: 20,9; 36,5; 40,9; 72,5; 80,9.

BRIEF DESCRIPTION OF THE DRAWINGS

In the drawings embodiments of the invention are illustrated. The drawings show.

DETAILED DESCRIPTION

Figure 1:
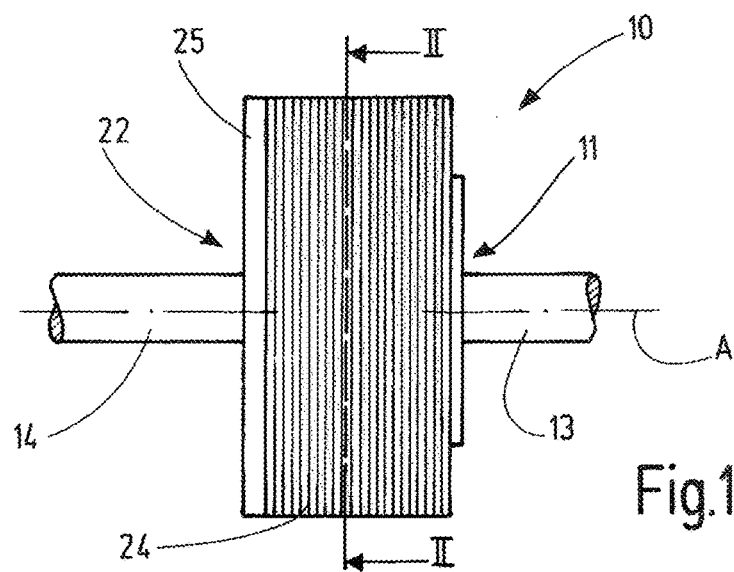
FIG. 1 an inventive hysteresis clutch in a schematic side view.

FIG. 1 illustrates a hysteresis clutch 10 comprising a first rotor 11 and a second rotor 12 that are connected or can be connected with driving or driven shafts 13, 14 respectively. The two rotors 11, 12 are apparent with regard to their construction, particularly from the cross-section illustration in FIG. 2 that represents slightly schematized the section II-II indicated in FIG. 1. Between the two rotors 11, 12 a ring-shaped substantial cylindrical gap 15 is defined through which magnetic flux lines pass substantially radially that are effective between the rotors 11, 12.

The first rotor 11 comprises a non-magnetic hub 16 that is configured, e.g. from aluminum, a suitable plastic or another diamagnetic or non-magnetic material. In addition, not further illustrated means for connection with the shaft 13 can be provided at the hub 16. Alternatively, a seamless integral configuration of the hub 16 with the shaft 13 is possible.

Figure 2:
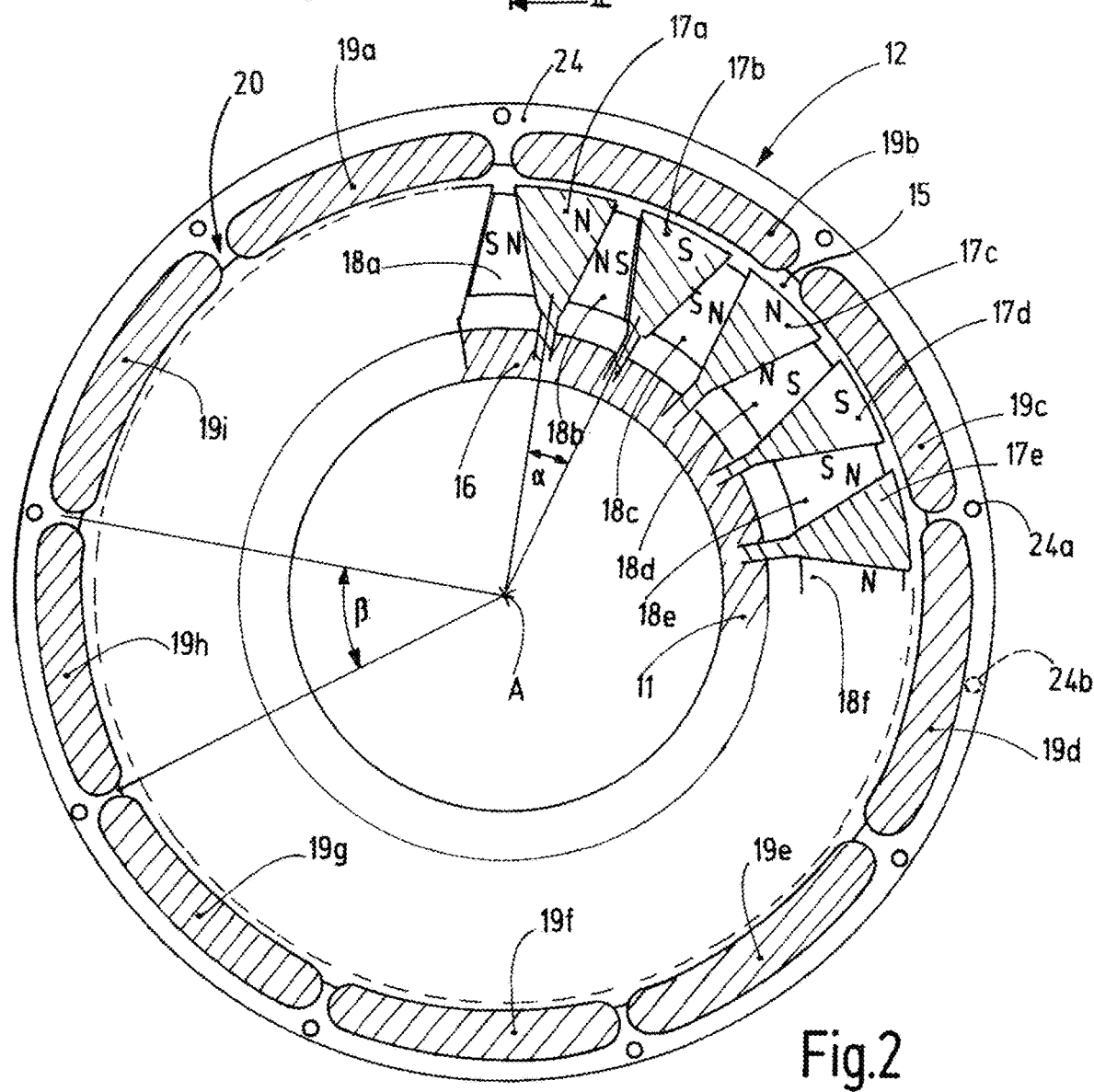
FIG. 2 the hysteresis clutch of FIG. 1 in a cross-sectional illustration cut along the line II-II in FIG. 1, FIG. 3 a permanent magnet of the second rotor in a perspective illustration, FIG. 4 B-H-diagrams of the used magnet materials, FIG. 5 a winding off of an inner view of the outer rotor of the hysteresis clutch in a first embodiment, FIG. 6 a winding off of an inner view of the outer rotor of the hysteresis clutch in a second embodiment.

Extending radially from the hub an even number of pole pieces 17 are provided, the reference numerals 17 of which are provided with a respective letter index a to e for a necessary distinction in FIG. 2. A subsequent reference to a pole piece 17 without letter index applies accordingly in the singular as well as in the plural like-wise for all of the pole pieces. The pole pieces 17 are configured at their outer periphery in a manner following the skin surface of a virtual cylinder. At their radial inner side they are fixed in or at the hub 16. For this a suitable form fit connection can be used that is supported by friction and/or material bond connection where appropriate. Each pole piece 17 is configured substantially prismatically wedge-shaped, wherein the nearly trapezoid-shaped faces of each pole piece are axially orientated.

Between pole pieces 17a, 17b; 17b, 17c etc. that are adjacent to each other, interstices are defined that extend in axial direction and that are trapezoid or wedge-shaped in cross-section, in which permanent magnets 18 are arranged. The reference numerals thereof are provided with a respective letter index a to f in FIG. 2 for a distinction as necessary. A subsequent reference to a permanent magnet 18 without letter index applies accordingly for all permanent magnets. The permanent magnets 18 comprise trapezoid-shaped cross-section that is adapted to the interstices between the pole pieces 17 and are fitted in these interstices. The permanent magnets 18 consist preferably of a hard magnetic magnet material with an energy product larger than 100 kJ/m$^3$, preferably larger than 200 kJ/m$^3$ and a coercive field strength that is remarkably larger than 1000 kA/m. For example, the permanent magnets 18 of the first rotor are rare earth magnets consisting of at least an element of the group iron, cobalt and nickel and in addition of at least one rare earth metal from the group neodymium, samarium, praseodymium, dysprosium, terbium, gadolinium and yttrium. Preferably the material of the first magnets 18 is a neodymium-iron-boron-alloy, particularly Nd$_2$Fe$_{14}$B. The magnetic predominant direction of the magnets 18 is preferably orientated in circumferential direction and thus substantially parallel to the narrow surface adjoining the air gap as well as to the wider surface orientated toward the hub 16. The magnetized permanent magnets 18 abut with their flanks that are configured in a planar manner against the flat sides of the pole pieces 17 and are clamped there and as appropriate held by the support of adhesive. Two magnets 18 abutting in each case against one pole piece 17 are thereby polarized in opposite sense such that magnetic poles of the same denominator abut at the flanks (flat sides) of the respective pole piece. For this the adjacent magnets 18 are polarized in the opposite sense respectively. As a consequence, adjacent pole pieces 17 form at their outer circumferential surfaces alternatingly a north pole and a south pole, as schematically indicated in FIG. 2.

Figure 5:
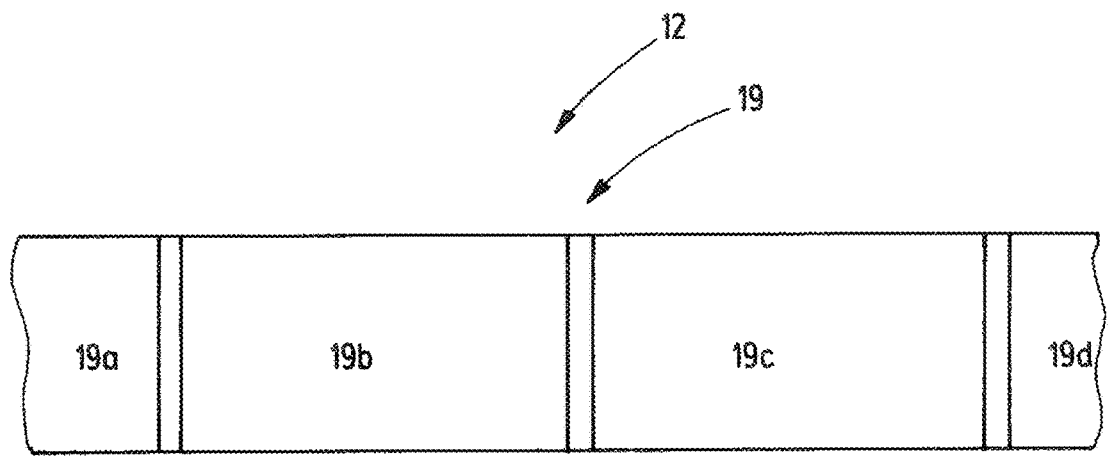

A second rotor 12 comprises at least one group of permanent magnets 19, the reference numerals 19 of which are provided with a letter index a to e respectively for allowing a distinct reference. A subsequent reference to a permanent magnet 19 without letter index applies accordingly for all of the permanent magnets 19. The number of permanent magnets 19 that are part of the group is preferably larger than two. In FIG. 5 a section of a winding off of the inner view of rotor 12 is illustrated with view radially outward.

Figure 3:
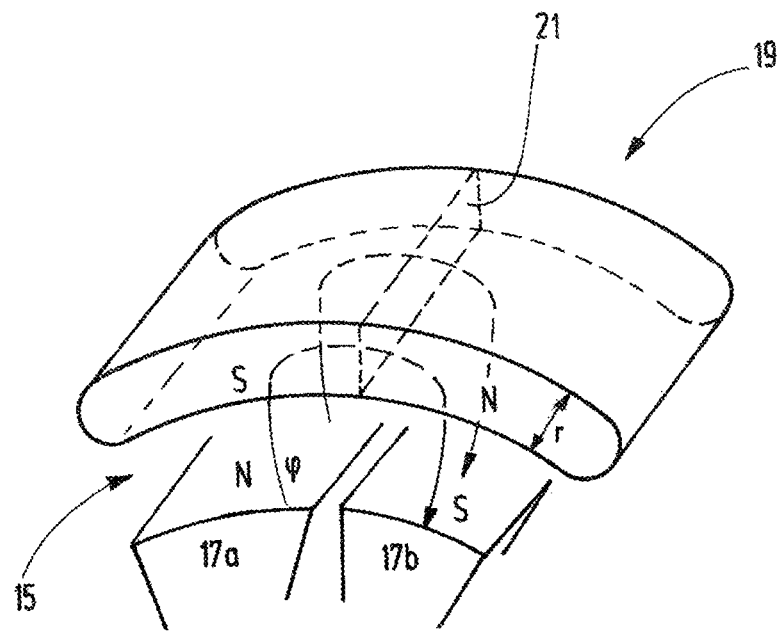

The permanent magnets 19 of the second rotor 12 adjoin the air gap 15 with their inner side. The inner side of the respective permanent magnets 19 is thereby curved following a circular arc such that the permanent magnet 19 finally forms a cylinder dish. The permanent magnet 19 comprises in radial direction, apart from its preferably rounded ends, a substantially uniform thickness. The permanent magnet 19 can be rounded or terminated by a planar face at its ends. In FIG. 3 the permanent magnet 19 is exemplarily for all permanent magnets 19a to 19i illustrated without letter index with slightly exaggerated curvature for a clearer illustration.

The permanent magnets 19a to 19i form a collar that is concentric to the rotation axis Ax with small gaps 20 extending in axial and radial direction. These gaps 20 are preferably not larger than the distances between adjacent pole pieces and anyway narrower than the width of a pole piece 17 measured in circumferential direction. The rotation axis Ax is a common rotation axis of both rotors 11, 12 and thus concurrently the rotation axis of the hysteresis clutch 10.

Due to the even number of pole piece 17 arranged in series along the circumference, an even number M of first magnets 18 is obtained (e.g. 20 magnets 18). The number S of the second magnets 19 arranged in series along the circumference is preferably selected such that the number M of first magnets 18 and the number S of second magnets 19 lead to different pole angles. This means that the number M of permanent magnets 18 of the first rotor 11 and the number S of the permanent magnets 19 of the second rotor 12 is respectively defined such that 360° divided through the two numbers M and S leads to different, preferably co-prime pole angles $\alpha$, $\beta$. The pole angles $\alpha$, $\beta$ comprise no common integer divisor. In addition, the second magnets 19 preferably have a length in circumferential direction such that they span over at least two pole pieces 17, as apparent from FIG. 2 based on the pole pieces 17a, 17b and the magnet 19b.

Alternatively or additionally at least one of the following conditions applies for the numbers M and S:

a) The two numbers M and S are co-prime, i.e. the numbers M and S do not have a common integer divisor, whereby a torque progress with low detent torque is achieved; and/or b) The product of the two numbers M and S divided through 180 is a power of the FIG. 2, i.e.: $M*S/180=2^N$, wherein N is an integer, preferably a natural number [N=0, 1, 2, 3 . . . ], whereby torque progress is achieved free of detent torque.

Examples for suitable pairs of numbers M, S are: 20,9; 36,5; 40,9; 72,5; 80,9.

The axial dimension of the pole pieces 17 preferably substantially corresponds with the axial extension of the permanent magnets 19. In doing so, the permanent magnet 19 receives the total magnetic flux φ originating from a pole piece 17.

The radial thickness of the permanent magnets 19 is preferably dimensioned such that a virtual sectional plane 21 through the magnet 19 that extends concurrently in longitudinal direction and radial direction comprises an area, such that the magnet material of the permanent magnet 19 reaches, at least at one location, its saturation flux density $B_{s2}$. In addition, reference is made to FIG. 4 in which the curve 22 illustrates the B-H-characteristic curve of a first permanent magnet 18 of neodymium-iron-boron-alloy, whereas the second curve 23 illustrates the B-H-characteristic curve of the second magnet 19 consisting of an aluminum-nickel-cobalt-alloy. The radial thickness of the second magnet 19 is so large that the area of the plane 21 multiplied with the saturation flux density $B_{s2}$ results in a magnetic flux φ equal to the flux φ that is supplied through the second magnet 19 from the adjacent pole pieces (e.g. 17a and 17b).

As is obvious, the first magnets 18 consist of a material, the coercive field strength $H_{c1}$ is larger than the coercive field strength $H_{c2}$ of the material of the second magnet 19. In addition, preferably the remanence induction $B_{r1}$ of the first magnets 18 is larger than the remanence induction $B_{r2}$ of the second magnets 19. The same applies for the saturation flux density $B_{s1}$ and $B_{s2}$. The total volume of the first magnets 18 can be equal or less than the total volume of the second magnets 19. The total volume of the first magnets is the sum of all volumes of all first magnets 18. The total volume of the second magnets 19 is the sum of all individual volumes of the second magnets 19. The magnet material of the first permanent magnets 18 comprises an energy product that is preferably five times to ten times as large as the energy product of the magnet material of second permanent magnets 19.

The second permanent magnets 19 are arranged in a holder 24 that comprises webs extending in the interstices 20. Preferably the holder 24 is laminated, i.e. formed by a stack of congruent metal sheet blanks assembled onto each other that are clamped to a firm packet by means of non-illustrated means such as tie rods or the like. For this, holes 24a, 24b are provided in the metal sheet blanks that serve for reception of respective screws or tie rods. Alternatively or additionally, the individual holder metal sheets can be glued to each other. The holder 24 is in addition connected with a face plate 25 that is in turn connected or connectable with the shaft 14. The face plate 25 and the shaft 14 can also be connected integrally with each other. The holder 24, the face plate 25 and the shaft 14 can also be connected integrally with each other, e.g. formed as injection mold complete part.

The hysteresis clutch 10 described so far operates as follows:

One of the shafts 13, 14 is subject to a driving torque and transmits the torque due to magnetic effect between the rotors 11, 12 to the respective other shaft. Subsequently, it is assumed that the shaft 13 is rotatingly driven as input shaft. Thus, the rotating first rotor 11 creates a magnetic rotary field, according to the example with 10 poles, that passes through the second permanent magnets 19. This is apparent with regard to the pole pieces 17a, 17b from the sketch-like illustration in FIG. 3. From the pole piece 17a, that is polarized as north pole, a magnetic flux φ originates that enters the permanent magnets 19 via the curved inner side adjoining the air gap 15, is redirected there in circumferential direction in order to pass the longitudinal sectional plane 21 substantially orthogonal, after that the flux in turn leaves through the inner surface facing the air gap 15 and reaches the pole piece 17b. Due to the interaction between the strength of the flux φ and the amount of the longitudinal sectional plane 21, at least at one location of this longitudinal sectional plane 21 the saturation flux density $B_{s2}$ of the magnetic material of the second magnet 19 is reached. In doing so, the longitudinal sectional plane 21 is dimensioned such that the saturation flux density $B_{s2}$ is not exceeded at any location as far as possible, however, not along the whole plane, in order to avoid or minimize a stray flux that extends in the radial proximity of the hysteresis clutch. In addition, the transmittable torque reaches its maximum this way.

Figure 4:
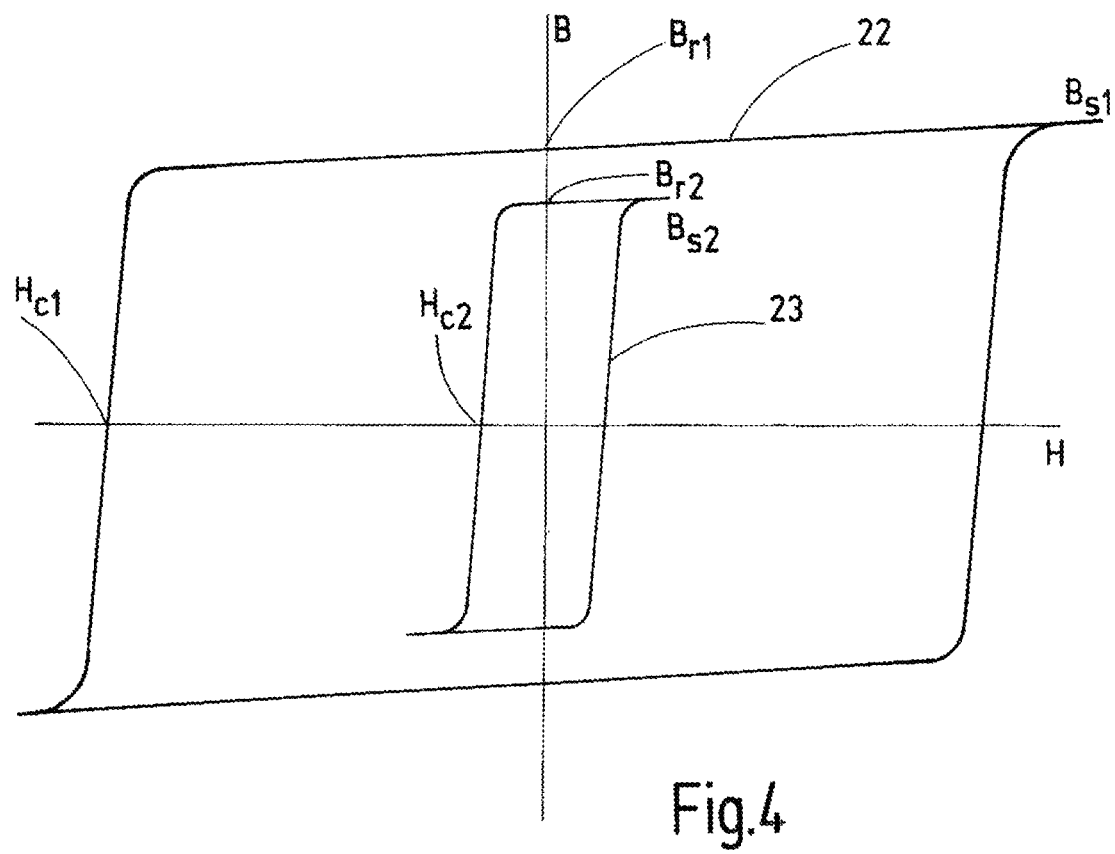

If the longitudinal sectional plane 21 is, however, so large that the saturation flux density is not reached at any location of the longitudinal sectional plane 21, the curve 23 represented in FIG. 4 is not set to the maximum anymore and the transmittable torque does also not reach its optimum value.

If for the description of the operation of the hysteresis clutch 10 is first assumed that shaft 14 is torque-free, the rotor 13 however is rotatingly driven, the two rotors 11, 12 run synchronously. This remains as long as only torques are taken from the shaft 14 that are below a slip limit. The slip limit is created in that due to the magnetic flux φ supplied by the permanent magnets 18, magnet poles are induced at the inner side of the permanent magnets 19, the shift of which is only possible starting with a defined minimum force. With increasing torque load of the hysteresis clutch first an angular rotation between the two rotors 11, 12 occurs in the context of which the induced south pole and the induced north pole of the second permanent magnet 19 is slightly shifted with reference to the north pole and the south pole of pole pieces 17a, 17b. The induced poles of the second magnet 19 are based on the magnetization of magnet material of the permanent magnet 19 as far as possible up to the saturation flux density $B_{s2}$.

Due to the pole shift that also increases with the increasing torque, the torque is first transmitted in a slip-free manner until the magnet material of the second permanent magnets 19 reaches and exceeds the coercive field strength $H_{C2}$. In this case the induced poles start to move on the collar of the second magnets 19 in circumferential direction, whereby the torque transmitted between shaft 13 and shaft 14 reaches its limit and from now on only increases by eddy currents induced in the second magnets 19.

In the hysteresis clutch 10 likewise the shaft 14 can serve as input shaft originating from which a torque can be transmitted to shaft 13. The torque flow is bidirectional.

Figure 6:
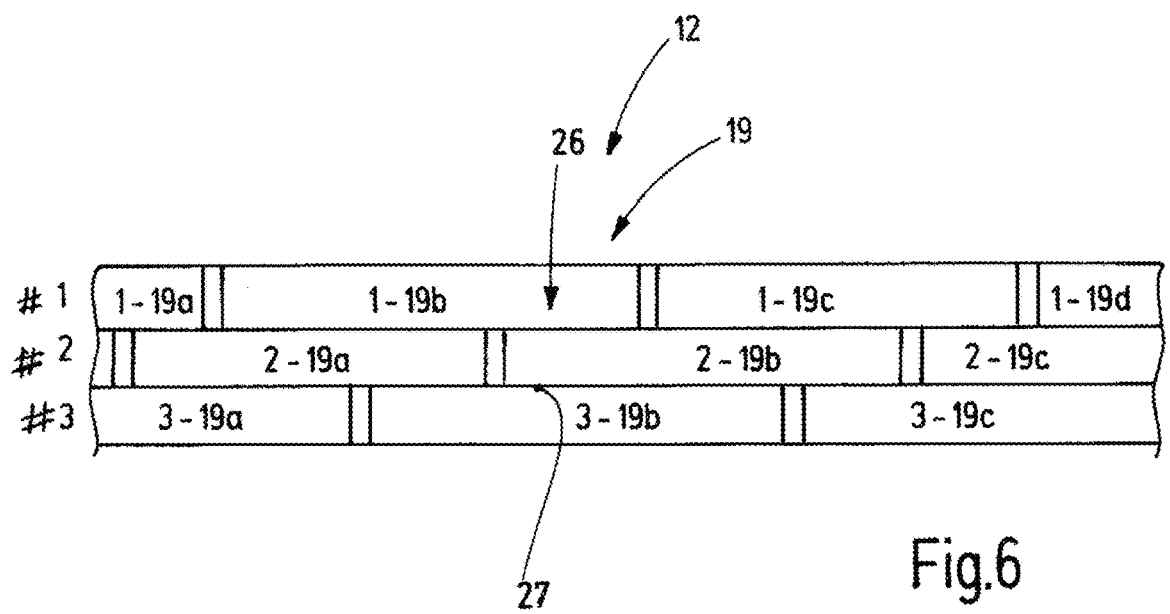

While the rotor 12 comprises one single group of second permanent magnets 19 in the embodiment of the hysteresis clutch 10 described above that form a collar orientated concentrically to the rotation axis Ax and that cover the first rotor 11 or its pole pieces 17 in axial direction completely, the second rotor 12 can also comprise two or more groups of second permanent magnets 19, as illustrated in FIG. 6. A first group #2 of permanent magnets 1-19, a second group #2 of permanent magnets 2-19 and a third group #3 of permanent magnets 3-19 are illustrated in FIG. 6. The permanent magnets 1-19 of the first group #1 (illustrated are 1-19a to 1-19d) form a first collar that is orientated concentrically to the rotation axis Ax.

Accordingly, the permanent magnets 2-19 of the second group #2 form a second collar concentric to the rotation axis Ax and the permanent magnets 3-19 of the third group #3 form a third collar concentric to the rotation axis Ax. The permanent magnets 19 of the three groups #1, #2, #3 can have an angular offset with regard to each other as indicated in FIG. 6, whereby permanent magnets 19 axially adjacent to each other, each cover interstices formed between permanent magnets 19 adjacent to each other in circumferential direction respectively. Between the permanent magnets 1-19 of the first group #1 and the permanent magnets 2-19 of the second group #2 a two-dimensional insulator 26 can be arranged that insulates preferably the permanent magnets 1-19 from the permanent magnets 2-19. Similarly an insulator 27 can be arranged between the permanent magnets 2-19 of the second group #2 and the permanent magnets 3-19 of the third group #3.

With this arrangement eddy currents occurring in the permanent magnets 19 are reduced, whereby the dependency of the amount of the transmitted torques from the rotation speed difference between the two rotors 11 and 12 is reduced. The torque-slip-characteristic curve is thus particularly flat. In addition, due to this measure, the tendency to form detent torques can be reduced, if they should occur. It is possible to define the number of permanent magnets 19 equally or differently in the three groups #1, #2 and #3. In addition, the number of permanent magnets 19 of each of the three groups must not necessarily be co-prime with the number of pole pieces 17, although this is preferred. Also the pole angles α, β of the two rotors 11, 12 must not necessarily be co-prime, although this is preferred as well.

In the inventive hysteresis clutch 10 a first rotor 11 is provided with magnets 18 that are polarized in pairs in the opposite sense in circumferential direction, between which pole pieces 17 for redirecting of the magnetic flux in radial direction are provided. A second rotor 12 comprises a series of second permanent magnets 19 on a circle concentric to the rotation axis Ax and extending in circumferential direction. The number of first magnets 18 and the number of second magnets 19 is preferably defined such that a smooth detent-torque-free or at least detent-torque-low torque progress is achieved. For this, the number M of permanent magnets of the first rotor and the number of permanent magnets S of the second rotor are defined in consideration of each other while complying specific conditions. For this the two numbers M and S can be defined according to at least one of the two following conditions: The two numbers M and S are co-prime and/or the product of the two numbers M and S divided through 180 is an integer power of the figure two ($M*S/180=2^N$, [N=0, 1, 2, 3 . . . ]).

LIST OF REFERENCE SIGNS

10 hysteresis clutch
11 first rotor
12 second rotor
13 first shaft
14 second shaft

15 air gap
16 hub
17 pole pieces
18 permanent magnets of the first rotor
19 permanent magnets of the second rotor
A rotation axis
20 interstice
21 longitudinal sectional plane
22 B-H-characteristic curve of the first permanent magnets
23 B-H-characteristic curve of the second permanent magnets
24 holder
24a mounting openings
25 face plate
26 insulator
27 insulator
Ax rotation axis
A number of the first permanent magnets
B number of the second permanent magnets

The invention claimed is:

1. A hysteresis clutch for transmitting rotational energy in machines, comprising:
a first rotor rotatable about a rotation axis that comprises a plurality of permanent magnets with a first coercive field strength, the plurality of permanent magnets of the first rotor have a trapezoid cross-section and are arranged with a narrow side radially outward and a wide side radially inward in pockets formed between adjacent pole pieces that are trapezoid-shaped in cross-section;
a second rotor rotatable about the rotation axis, the second rotor having at least two permanent magnets with a second coercive field strength, the second coercive field strength being lower than the first coercive field strength, the at least two permanent magnets being arranged sequentially in a slip direction, wherein the plurality of permanent magnets of the first rotor comprise a first number of permanent magnets and the at least two permanent magnets of the second rotor comprise a second number of permanent magnets, wherein the first number of the permanent magnets of the first rotor and the second number of the permanent magnets of the second rotor are co-prime with regard to each other and do not have a common integer divisor, wherein (first number of permanent magnets of the first rotor)*(second number of permanent magnets of the second rotor)/180=$2^N$, wherein N is a natural number [N=0, 1, 2, 3 . . . ]; and
a truncated cone-shaped or cylindrical air gap located between the first rotor and the second rotor.

2. The hysteresis clutch according to claim 1, wherein the plurality of permanent magnets of the first rotor and the at least two permanent magnets of the second rotor are composed of different hard magnetic materials.

3. The hysteresis clutch according to claim 1, wherein the plurality of permanent magnets of the first rotor have a maximum energy product that is larger than 100 kJ/m$^3$ and/or at least one of the at least two permanent magnets of the second rotor has a maximum energy product that is larger than 10 kJ/m$^3$, but smaller than 100 kJ/m$^3$.

4. The hysteresis clutch according to claim 1, wherein the plurality of permanent magnets of the first rotor are rare earth magnets comprising at least one element of the group comprising; iron, cobalt and nickel and in addition at least one rare earth metal of the group comprising; neodymium, samarium, praseodymium, dysprosium, terbium, gadolinium and yttrium.

5. The hysteresis clutch according to claim 1, wherein the plurality of permanent magnets of the first rotor comprise a magnetic anisotropy that defines a predominant direction for magnetization of the plurality of permanent magnets, wherein the predominant direction is orientated in circumferential direction with regard to the rotation axis of the first rotor.

6. The hysteresis clutch according to claim 1, wherein the plurality of permanent magnets of the first rotor are polarized in circumferential direction, and wherein adjacent permanent magnets of the plurality of permanent magnets are polarized in an opposite sense respectively.

7. The hysteresis clutch according to claim 1, wherein
a) a torque progress of the hysteresis clutch is achieved by a low detent torque; and/or
b) wherein a torque progress of the hysteresis clutch is achieved that is free of detent torque.

8. The hysteresis clutch according to claim 1, wherein at least one permanent magnet of the at least two permanent magnets of the second rotor has a coercive field strength that is larger than 200 kA/m.

9. The hysteresis clutch claim 1, wherein at least one permanent magnet of the at least two permanent magnets of the second rotor is an AlNiCo-magnet.

10. The hysteresis clutch according to claim 9, wherein the at least two permanent magnets of the second rotor are configured in a cylinder-dish-shaped manner with a dish inner side in a case that limits the truncated cone-shaped or cylindrical air gap radially outward.

11. The hysteresis clutch according to claim 10, wherein a radial thickness of the at least two permanent magnets of the second rotor is dimensioned such that due to a magnetic flux $\varphi$ created from the plurality of permanent magnets of the first rotor in at least one point on a longitudinal sectional plane of each permanent magnet of the at least two permanent magnets of the second rotor such that a saturation flux density of each permanent magnet of the at least two permanent magnets of the second rotor is achieved.

12. The hysteresis clutch according to claim 8, wherein each permanent magnet of the at least two permanent magnets of the second rotor spans over at least two pole pieces arranged between permanent magnets of the plurality of permanent magnets of the first rotor that are adjacent to each other.

13. The hysteresis clutch according to claim 1, wherein at least one permanent magnet of the at least two permanent magnets of the second rotor are held in a laminated holder.

14. The hysteresis clutch as in claim 3, wherein the plurality of permanent magnets of the first rotor have a maximum energy product $(B\text{-}H)_{max}$ that is larger than 200 kJ/m$^3$.

15. The hysteresis clutch as in claim 4, wherein the plurality of permanent magnets of the first rotor are rare earth magnets comprising a neodymium-iron-boron-alloy and at least one element of the group comprising; iron, cobalt and nickel.

16. The hysteresis clutch as in claim 4, wherein the plurality of permanent magnets of the first rotor are rare earth magnets comprising $Nd_2Fe_{14}B$ and at least one element of the group comprising; iron, cobalt and nickel.

17. The hysteresis clutch according to claim 8, wherein at least one permanent magnet of the at least two permanent magnets of the second rotor has a coercive field strength $(H_C)$ that is larger than 1000 kA/m.

18. The hysteresis clutch according to claim 3, wherein the plurality of permanent magnets of the first rotor have a maximum energy product $(B\text{-}H)_{max}$ that is larger than 100 kJ/m$^3$ and/or at least one of the at least two permanent magnets of the second rotor has a maximum energy product $(B\text{-}H)_{max}$ that is larger than 10 kJ/m$^3$, but smaller than 100 kJ/m$^3$.

\* \* \* \* \*